(No Model.)
J. HOFFMAN.
ERASER HOLDER FOR PENCILS.
No. 383,357. Patented May 22, 1888.
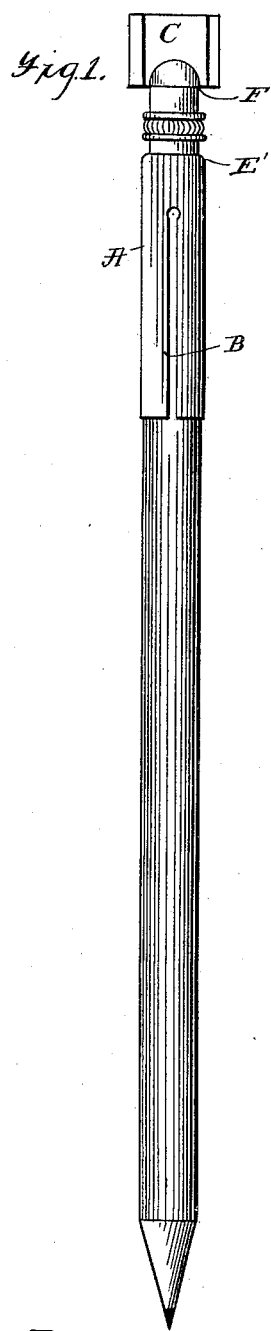
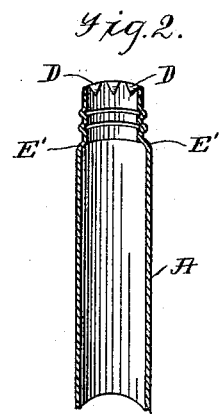
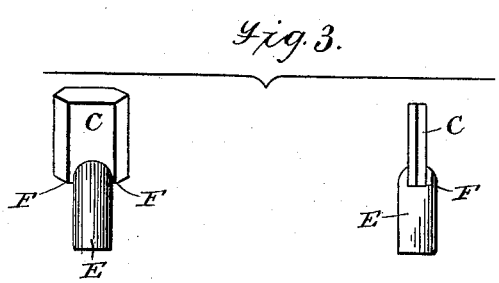
Attest
W. E. Bowen
George W. Bodless
Inventor:
Joseph Hoffman
by Phillips Abbott
his attorney.

UNITED STATES PATENT OFFICE.

JOSEPH HOFFMAN, OF HOBOKEN, NEW JERSEY, ASSIGNOR TO GUSTAVUS A. GOLDSMITH, OF NEW YORK, N. Y.

ERASER-HOLDER FOR PENCILS.

SPECIFICATION forming part of Letters Patent No. 383,357, dated May 22, 1888.

Application filed December 10, 1887. Serial No. 257,509. (No model.)

*To all whom it may concern:*

Be it known that I, JOSEPH HOFFMAN, a citizen of the United States, and a resident of Hoboken, in the county of Hudson and State of New Jersey, have invented certain new and useful Improvements in Eraser-Holding Tips for Pencils, of which the following is a specification.

My invention relates to rubber-holding tips for pencils; and it consists in the construction of the tip, hereinafter described, and illustrated in the drawings on a somewhat enlarged scale.

In the drawings, Figure 1 illustrates a plan view of the holder and rubber in position on a pencil. Fig. 2 illustrates a vertical section of the holder. Fig. 3 illustrates a rubber eraser of the shape which I prefer to use with my eraser-holder, having shoulders above the shank thereof.

A is the rubber-holding tip. It is preferably split part way up one side, as at B, so that it may be removed from the rear end of the pencil and applied to the other end as a point-protector.

C is the rubber.

D are teeth, preferably stamped out from the same piece of metal which composes the tip, although they may be made in any other preferred manner. They extend from the upper end of the tubular part of the holder inwardly and are preferably given a downward inclination, so that they resemble barbs and will catch in the rubber and firmly hold it against withdrawal, and also so that when the rubber has become worn out the stump or shank E of the used-up rubber may be easily ejected from the holder by pressure on it from without inwardly, whereby (the holder being removed from the pencil) it will be punched through the holder, and a new rubber may then be substituted.

I prefer to make a shoulder, E', in the holder to limit the introduction of the pencil.

It is not essential that the teeth should have the downward inclination, and, in order that the shank or stump of the used-up rubber may be more readily punched through the holder, I prefer to place the teeth at the end of the holder, and, in order that the pressure on the rubber during the act of erasing may not force the rubber to far into the holder, I prefer to make the rubbers in the shape shown in the drawings—that is to say, having the shoulders F F. Other forms of rubber may be used, if desired. The teeth embed themselves in the rubber and firmly hold it in place, being different in their action from the threads or corrugations heretofore used in such devices, because, the rubber expanding on all sides of each tooth, they each oppose its movement in any direction, excepting through the holder when the teeth are made in barb form, as before stated, in which direction it may be forced without much difficulty.

A characteristic feature of my holder is that the part which is above the shoulder E' is a solid tube—that is to say, not split—and when I use the word "tubular rubber-holder" in the claims I mean that the tube is not split at the rubber-holding part; or, if made of a split tube in the first instance, the rubber-holding part should be confined by a ring or its equivalent, which may be removable, if desired. In no case, however, should the rubber extend through the sides of the tube. It is held by the teeth on the end of the tube only.

Having described my invention, I claim—

1. A tubular rubber-holder having inwardly-extending pointed teeth at the end thereof, arranged horizontally, substantially as set forth.

2. A tubular rubber-holder having inwardly and downwardly projecting pointed teeth at or near the end thereof, arranged horizontally, substantially as set forth.

3. A tubular rubber-holder having inwardly-projecting teeth at the end thereof, arranged horizontally, and a shoulder between the rubber-holding extremity and the part which fits over the pencil, substantially as set forth.

4. The combination of a tubular rubber-holder having inwardly-projecting teeth near the end thereof and a rubber eraser having the shank E, adapted to enter the unsplit tubular holder, and shoulders F, substantially as set forth.

Signed at New York, in the county of New York and State of New York, this 9th day of December, A. D. 1887.

JOSEPH HOFFMAN.

Witnesses:
PHILLIPS ABBOTT,
H. T. BRIGHAM.